W. L. BLISS.
SYSTEM OF ELECTRICAL DISTRIBUTION.
APPLICATION FILED FEB. 26, 1917.
1,393,940.
Patented Oct. 18, 1921.
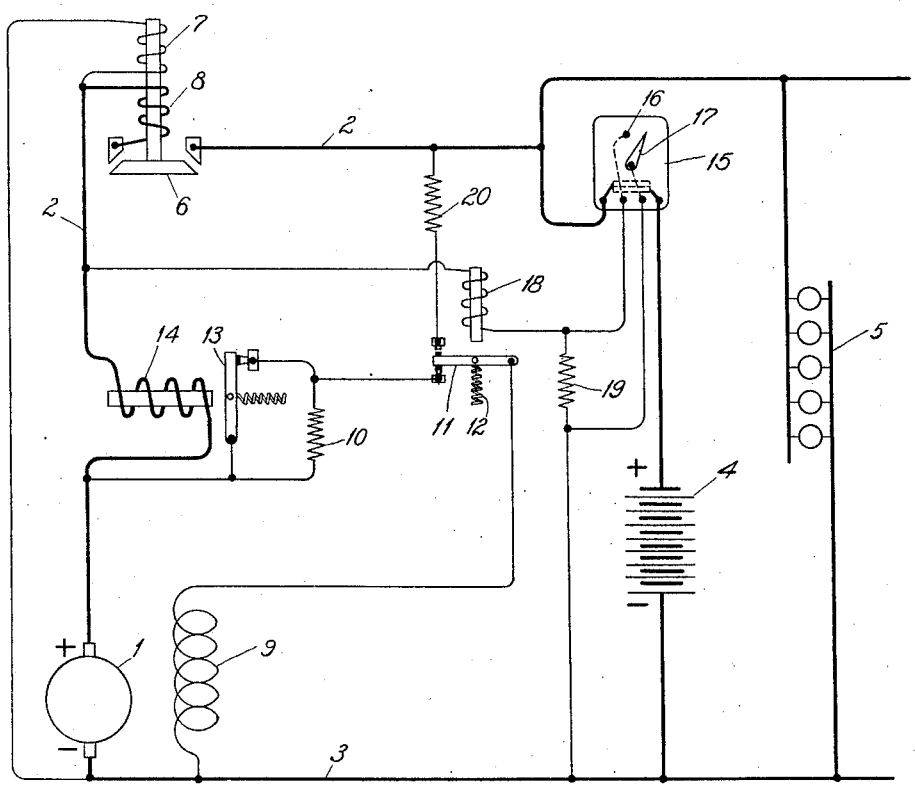
Inventor
William L. Bliss.
Witnesses
Fay E Bronk.
Ralph Munden
By Raymond N Von Uest
Attorney

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,393,940.     Specification of Letters Patent.     Patented Oct. 18, 1921.

Application filed February 26, 1917. Serial No. 150,998.

*To all whom it may concern:*

Be it known that I, WILLIAM L. BLISS, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the present invention relates to systems involving a generator which is subject to great variations in speed, a storage battery and translating devices. When the generator is operating at a sufficient speed, it will supply current to the translating device and also supply the battery. When the generator is not operating at a sufficient speed the battery will be operative to supply said translating circuit. It is desirable that some means should be provided for preventing overcharge of the storage battery.

In such systems it is requisite to provide a switch between the generator and storage battery to prevent back discharge from the storage battery through the generator when the generator is developing only a low voltage or is at rest.

The present invention has for one of its objects the provision of a system in which overcharging of the battery will be prevented and in which chattering of the switch referred to will not occur.

A further object is to provide a system of the kind referred to in which the charging of the battery will be governed through instrumentalities which are responsive to the net charge of said storage battery.

Further objects will be apparent as the description proceeds.

The one figure of the drawing represents diagrammatically one embodiment of the present invention.

The generator 1 is adapted to be driven from any suitable source, as, for instance, a car axle, or from the engine of a motor car. Said generator 1 is adapted to supply mains 2 and 3. Connected in parallel branches across mains 2 and 3 are the storage battery 4 and the lamp circuit 5. Connected in one of the mains is the automatic switch 6 which is provided with the usual lifting coil 7 and the usual holding coil 8. This automatic switch 6 may be of any preferred construction. It will be closed when the generator is developing a voltage equal to or greater than the voltage of the storage battery and will be open when the generator is inoperative to develop such a voltage. The generator 1 is provided with a field winding 9, which is shown as being connected across the generator terminals through the resistance 10 and the switch 11. The switch 11 is normally held in its lowermost position by the spring 12. The resistance 10 is adapted to be short-circuited by a switch 13, which switch 13 is normally spring-held in short-circuiting position. The switch 13 is adapted to vibrate rapidly to open and close the short circuit around resistance 10 to control the effective energization of the field circuit 9. The switch 13 is illustrated as being controlled by the solenoid 14, connected in the main 2. It will be understood that the present invention is not limited to a system involving a regulator located in one of the main leads, or to the vibratory regulator illustrated, or to a system involving any regulator.

Located in the battery branch is the ampere hour meter 15. This ampere hour meter may be of any preferred construction but should be of a type which automatically changes its rate of registration upon reversal of direction of current flow therethrough. Such a meter can be calibrated to compensate for the losses in the battery, whereby said meter will, at all times, indicate the available charge in the battery. Said meter 15 is provided with a stationary contact 16 and a movable contact 17. Said movable contact 17 is adapted to contact with the fixed contact 16 to close a circuit which will be described later.

Connected across the terminals of the generator is a circuit including the solenoid 18 and the resistance 19. The solenoid 18 is located in a position to attract the switch 11 against the tension of the spring 12. When the solenoid 18 attracts the switch 11 to its uppermost position, it will connect the field circuit 9, through the resistance 20, to the main 2 at a point to the right of the automatic switch 6, whereby the field circuit 9 will be connected across the storage battery 4.

The movable contact 17 and the fixed contact 16 of the ampere hour meter are connected to the ends of the resistance 19, whereby when said contacts are in engagement, said resistance 19 is short-circuited.

A mode of operation of the above described embodiment of the present invention is substantially as follows: When the generator is at rest or is operating at a speed insufficient to develop a voltage equal to the voltage of the storage battery, the automatic switch 6 will be open and the storage battery 4 will be operative to supply the lamp circuit 5. When the generator 1 is operated at a sufficient speed to develop the necessary voltage, the automatic switch 6 will close and current will be delivered by the generator through the solenoid 14 to supply the storage battery 4 and the lamp circuit 5. If the generator should tend to deliver a higher value of current than is desired, the solenoid 14 will attract switch 13 to throw the resistance 10 into the field circuit, thereby reducing the field excitation of the generator. The switch 13 will have a rapid vibratory motion in a manner which is well understood. The generator will thereby be prevented from delivering too high a current. The ampere hour meter will measure the input to the battery and when a charge is delivered to said battery sufficient to fully charge the same, the movable contact 17 will be in engagement with the fixed contact 16 whereby to short-circuit the resistance 19, which is in series with the solenoid 18. Inasmuch as the resistance 19 is now short-circuited, solenoid 18 will have sufficient strength to attract the switch 11 and to connect the field circuit 9 across the storage battery through the resistance 20. The resistance 20 may be chosen of the proper value to reduce the field excitation to the value desired, which should preferably be of a value to cause the opening of the automatic switch 6. The provision of means for insuring the field excitation at this time will prevent chattering of the automatic switch and will insure stability of operation of the generator in a manner which is well understood. The resistance 19 should be chosen of such a value that the solenoid 18 will have sufficient strength to hold the switch 11 in its attracted position even after the short-circuit is removed from around the said resistance 19. The solenoid 18 will therefore hold the switch 11 in its uppermost position until the speed of the generator 1 is reduced materially, at which time the spring 12 will draw switch 11 to its lowermost position, putting the parts back into the position illustrated in the drawing.

One embodiment of the present invention has been described in detail. Many modifications will occur to those skilled in the art. It is intended that this patent shall include all such modifications that fall within the scope of the invention as defined by the appended claims.

What I claim as new and desire to secure by Letters Patent of the United States is:—

1. In an electrical system of distribution, in combination, a variable speed generator, a storage battery and a lamp circuit, an automatic switch between said generator and said battery, said generator having a field circuit, a switch for connecting said field circuit on either the generator or battery side of said automatic switch, said second mentioned switch being responsive to the generator voltage and to the net input to said battery.

2. In combination, a variable speed generator provided with a field circuit, a storage battery, an automatic switch between said generator and said battery, means for selectively connecting said field circuit on one side or the other of said automatic switch, an electromagnetic winding for controlling said connecting means, and means conjointly responsive to the input to said battery and to the generator voltage for governing said connecting means.

3. In a system of electrical distribution, in combination, a generator, a storage battery, an automatic switch therebetween, a field circuit for said generator normally connected across said generator on one side of said automatic switch, voltage controlled means for connecting said field circuit across said battery on the other side of said automatic switch through a path of greater resistance, and means responsive to the net input to said battery for controlling said voltage controlled means.

4. In an electrical system of distribution, in combination, a generator provided with a field circuit, a storage battery, an automatic switch between said generator and said battery, an electromagnetic winding responsive to the voltage across said generator adapted to connect said field circuit across said battery on the battery side of said automatic switch, a resistance in series with said winding, and means responsive to the net input to said battery for short-circuiting said resistance.

In witness whereof I have hereunto subscribed my name.

WILLIAM L. BLISS.